J. C. COLE.
REMOVABLE RIM CONSTRUCTION.
APPLICATION FILED MAR. 25, 1912.
1,119,067.
Patented Dec. 1, 1914
2 SHEETS—SHEET 1.
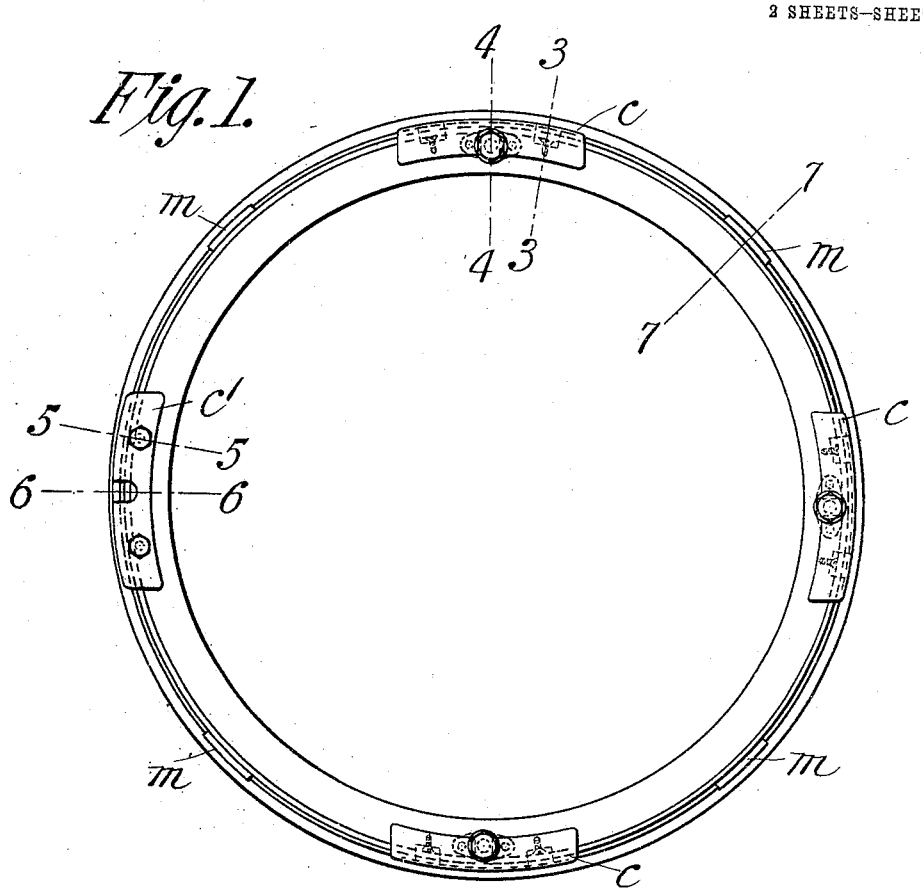
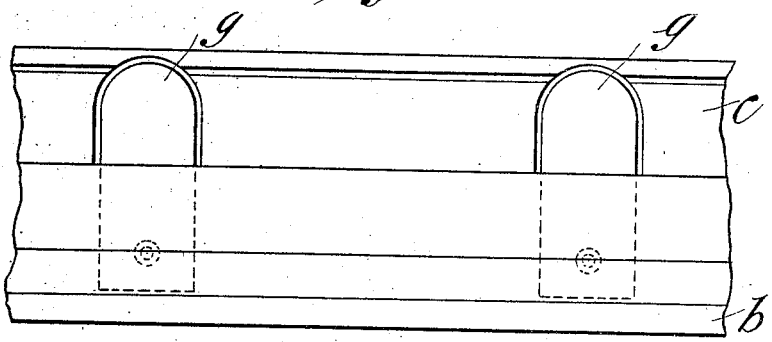
WITNESSES:
H. L. Sprague
R. M. Mowry
INVENTOR,
John C. Cole,
BY
Chapin & Co
ATTORNEY.

J. C. COLE.
REMOVABLE RIM CONSTRUCTION.
APPLICATION FILED MAR. 25, 1912.

1,119,067.

Patented Dec. 1, 1914.

2 SHEETS—SHEET 2.

WITNESSES:
H. L. Sprague
R. M. Mowry

INVENTOR,
John C. Cole,
BY
Chapin & Co
ATTORNEY.

UNITED STATES PATENT OFFICE.

JOHN CLARENCE COLE, OF CHICOPEE FALLS, MASSACHUSETTS, ASSIGNOR TO FISK RUBBER COMPANY, OF CHICOPEE FALLS, MASSACHUSETTS, A CORPORATION OF DELAWARE.

REMOVABLE-RIM CONSTRUCTION.

1,119,067. Specification of Letters Patent. Patented Dec. 1, 1914.

Application filed March 25, 1912. Serial No. 686,005.

*To all whom it may concern:*

Be it known that I, JOHN CLARENCE COLE, a citizen of the United States of America, residing at Chicopee Falls, in the county of Hampden and State of Massachusetts, have invented new and useful Improvements in Removable-Rim Construction, of which the following is a specification.

This invention relates to that class of apparatus which is structurally adapted to make a convenient and efficient means for changing tires.

It relates specifically to such apparatus in which a rim (known as the fixed or wheel rim) is permanently fastened to the felly by any suitable means, as by shrinking the fixed rim on the felly, and in which a removable or tire rim coöperates with the fixed rim to which it is fastened or unfastened as the tire is to be placed on the wheel or removed therefrom. This class of apparatus is well known.

It is the object of this invention to provide simple and efficient means by which the removable rim can be attached or detached from the fixed rim without any of the inconveniences and loss of time which sometimes occurs in the known form of apparatus.

Another object of the invention is to improve the details of construction in the class of apparatus referred to.

Other objects of the invention will be disclosed in the following detailed description and annexed claims.

Figure 3:
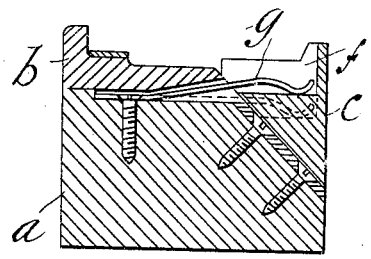
Figure 4:
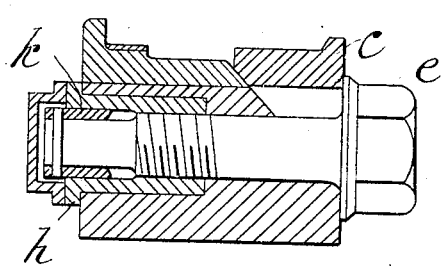
Figure 5:
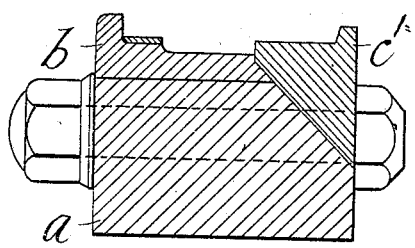
Figure 6:
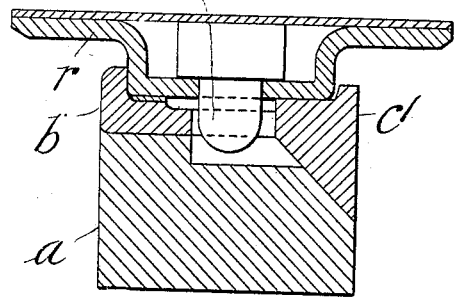
Figure 7:
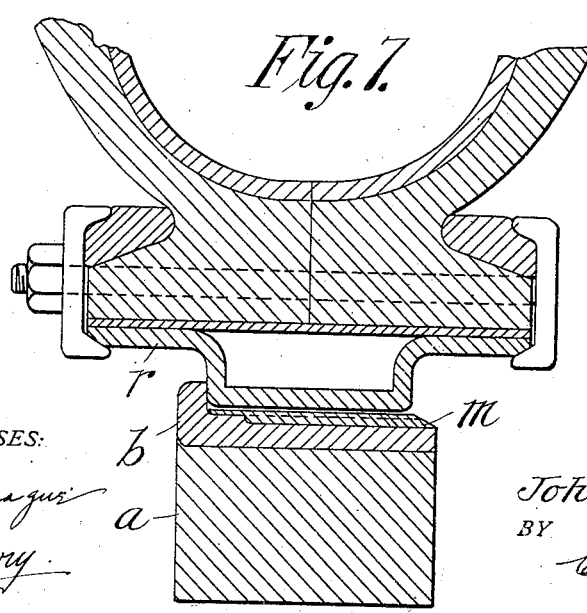

In the drawings forming part of this application,—Figure 1 is a side view of the assembled parts of this invention. Fig. 2 is a detail plan view showing the position, mounting, and relative arrangement of the springs to automatically loosen the fastening devices. Figs. 3, 4, 5, 6, and 7 are cross sectional views taken on lines 3—3, 4—4, 5—5, 6—6, and 7—7 respectively of Fig. 1,— Fig. 7 showing also the removable or tire rim and the manner in which the tire is attached.

As is well known, one of the forms of this kind of apparatus is that in which the removable rim is slipped over the fixed rim and an expanding ring extending all the way around the wheel is forced up through coöperating beveled faces of the ring and fixed rim against the under side of the removable rim by bolts. It has been found that after such a structure has been used for some time the expanding ring is not easily removed and where quick changes of tires have been desirable, a certain amount of time has been lost. In the invention herein disclosed this time will be saved.

Referring to the drawings, the felly $a$ (see Fig. 3) has fixed thereto the rim $b$. The fastening device $c$ has an inwardly beveled face coöperating with a like face on the felly and fixed rim. On the whole wheel there are four of these fastening devices (see Fig. 1) one of them $c^1$, being permanently fixed thereon (see Fig. 5) and the other three being attached and detached conveniently by bolts $e$ of special construction.

Whenever the bolt $e$ of any one of the three detachable fastening devices $c$ is loosened two springs $g$ (see Figs. 2 and 3)—one mounted on each side of the bolt $e$,—force the device $c$ downwardly and radially so that the holding flange thereof is at or below the level of the fixed rim, thus permitting (when the other fastening devices are also loosened) the removal of the tire rim from the position indicated in Fig. 7. These springs bear on the bottom of the recesses $f$ in the devices $c$ and are fastened to the felly under the fixed rim (see Fig. 3).

It is apparent that the operator needs only to loosen the three bolts $e$ when the springs automatically place the fastening devices out of the way, whereupon the tire rim $r$ may be moved axially from the fixed rim at all points except where the fastening device $c^1$ holds it. The rim is slightly tipped at this point and readily removed bodily from any contact with the wheel.

Where the movable fastening devices are placed at only three points around the wheel, and then only for a small arc thereof, they may be easily thrown out of operative position with practically no tendency to stick. Together with the fixed or permanent fastening device they form ample holding means for the removable or tire rim.

The bolts $e$ are of a special form which coöperate with the structure already described to render the same more convenient than would be the case with ordinary bolts. The end of the bolt $e$ is turned down (see Fig. 4) and the part just back of the turned down end is threaded into a hollow nut $h$.

A collar $k$, shorter than the turned down portion, is fastened on the end of the bolt. When the latter is turned it moves axially a distance sufficient to allow the fastening devices $c$ to move to releasing position, whereupon the collar $k$ prevents further axial outward movement of the bolt. The operator thus loosens the bolts to the required distance after which they are left in position for immediate use and can never be lost or misplaced. This structure results in a considerable saving of time and is most important for that reason, as well as its convenience.

As the removable or tire rim is to be placed on the fixed rim the latter is usually turned down or finished true to receive the tire rim. This involves considerable trouble and expense to avoid which the following structure is used: The fixed rim is a little smaller in diameter than the removable rim and four bosses $m$ are formed thereon (see Fig. 1) each one about midway between two fastening devices $c$. These bosses are turned true to receive the removable rim and when the fastening devices $c$ are forced into holding position, there is ample contacting surface between the fixed and removable rims.

It is desirable to have a boss with a true surface on the fixed rim adjacent the fastening devices to coöperate with the latter in holding the removable rim on the fixed rim. In order to properly position the removable with respect to the fixed rim, a dowel pin $t$ is fixed in the former to enter a recess adjacent the permanent or fixed fastening device $c^1$.

While applicant has described his invention in specific detail, the same may be embodied in apparatus of different specific construction. It is therefore desired to claim the invention generally as well as in specific detail.

What I claim, is:—

1. In a device of the class described, a felly having a fixed rim thereon, a removable rim, separate fastening devices coöperating with said felly, fixed and removable rims to bind the latter in operative position, each fastening device having a separate wedge-shaped portion, means to wedge the same into position to bind the removable rim on the fixed rim at the point where said fastening device is placed, springs on the felly and in engagement with said wedge shaped portions, s springs adapted to positively and automatically force the wedge-shaped portion inwardly and downwardly out of operative position when the first mentioned means is not in wedging condition.

2. A fixed rim having an inclined face, a removable rim adapted to be carried by the fixed rim, a wedge shaped element adapted to bind the removable to the fixed rim, a bolt for operating said wedged-shaped element and resilient means for automatically forcing said wedge-shaped elements radially inward upon release thereof by the bolt.

3. In a demountable rim structure, a felly, an inclined surface thereon, a rim fixed to the felly, a removable rim, a series of wedges having slotted holes therethrough, bolts in said slotted holes extending through said felly, said bolts adapted, when tightened to force said wedges upwardly and inwardly on said inclined surface to bind the removable to the fixed rim, and springs bearing against the upper surface of said wedges and adapted when said bolts are loosened to cause said wedges to travel downwardly and outwardly on said inclined surface, whereby said wedges are removed from the axial path of said removable rim.

4. In combination, a felly having a fixed rim thereon, and a series of beveled sections around the periphery thereof, a demountable rim adapted to be held on the fixed rim, one of said rims being provided with a transverse channel adapted to position the demountable rim on the fixed rim, means on the other rim adapted to engage the sides of said channel, whereby the demountable rim may be positioned on the fixed rim for swinging into registering position therewith and a series of holding devices arranged to bind the demountable to the fixed rim each comprising a beveled block, and an operating bolt therefor passing through the felly and in threaded engagement therewith, and means to limit the movement of the bolt in both directions whereby it is always in position to operate.

JOHN CLARENCE COLE.

Witnesses:
FRANKLIN G. NEAL,
HARRY W. BOWEN.